United States Patent [19]

Salomon

[11] Patent Number: 4,719,158

[45] Date of Patent: Jan. 12, 1988

[54] PROCESS AND APPARATUS FOR CONVERTING ROCKING MOTION INTO ELECTRICAL ENERGY

[75] Inventor: Robert E. Salomon, Philadelphia, Pa.

[73] Assignee: Temple University-of the Commonwealth System of Higher Education, Philadelphia, Pa.

[21] Appl. No.: 31,692

[22] Filed: Mar. 27, 1987

[51] Int. Cl.⁴ .......................................... H01M 14/00
[52] U.S. Cl. ..................................... 429/50; 429/101; 290/53
[58] Field of Search .................... 429/101, 50; 290/53, 290/42

[56] References Cited

U.S. PATENT DOCUMENTS 4,178,517  12/1979  Salomon et al. ...................... 290/53

OTHER PUBLICATIONS

R. E. Salomon, et al., "Gas Concentration Cells for the Conversion of Ocean Wave Energy", *Ocean Engineering*, vol. 6, pp. 317–327 (1979).
M. E. McCormick, "A Modified Linear Analysis of a Wave Energy Conversion Buoy", *Ocean Engineering*, vol. 3, pp. 133–144 (1976).

Primary Examiner—Donald L. Walton
Attorney, Agent, or Firm—Seidel, Gonda, Goldhammer & Abbott

[57] ABSTRACT

A device and method for converting ocean wave energy into electricity either on moored buoys or in small vessels. The device and method of the invention utilize a U-shaped tube in communication with a gas concentration cell. The U-shaped tube resides in a cradle or other support means, secured to the buoy or other base which imparts wave energy thereto. The U-shaped tube contains a combination of liquid and hydrogen gas. The rocking of the U-shaped tube creates varying gas pressure differentials, which deposits oppositely charged particles on parallel electrocatalytic electrodes located within the gas concentration thereby creating an electrical potential therebetween, according to the Nernst equation.

8 Claims, 4 Drawing Figures

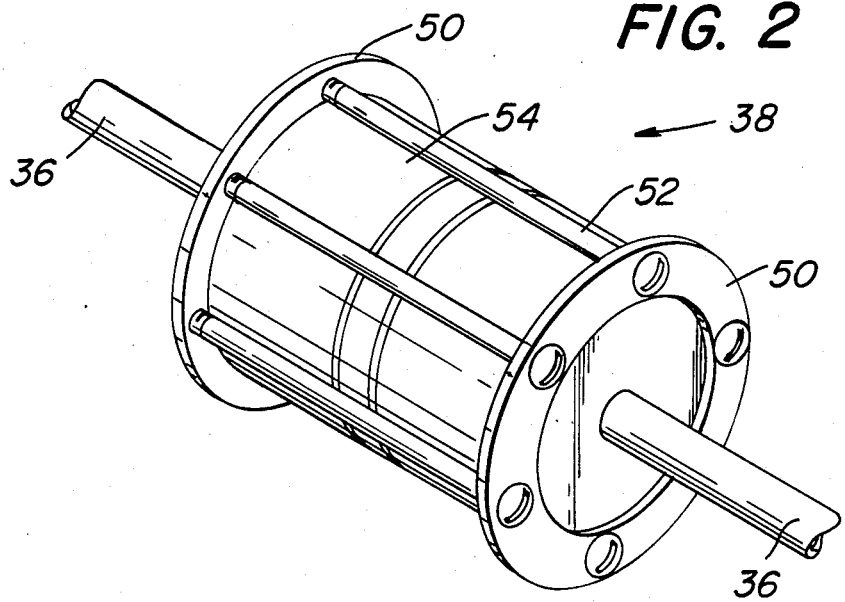
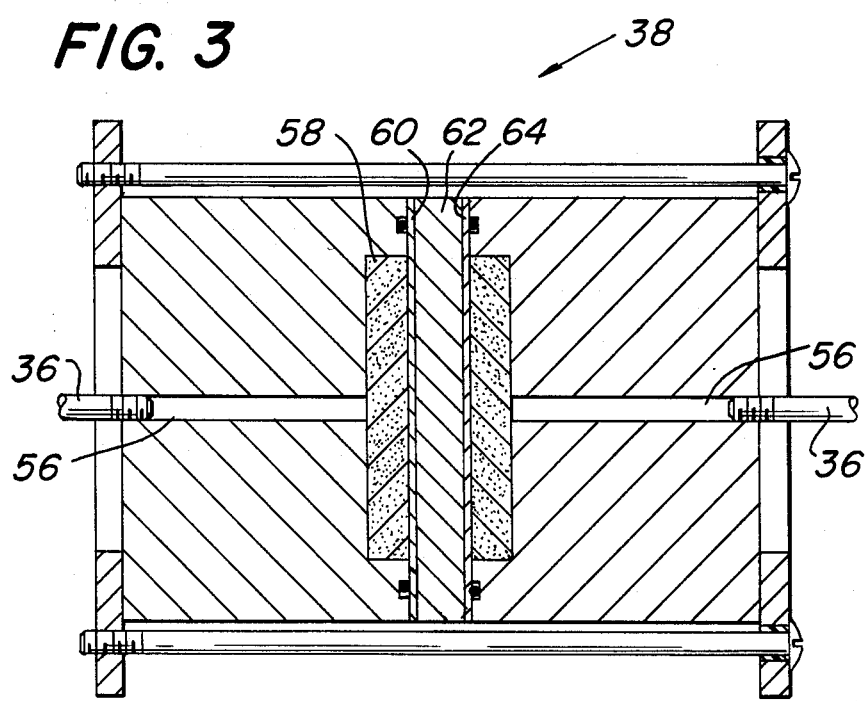

PROCESS AND APPARATUS FOR CONVERTING ROCKING MOTION INTO ELECTRICAL ENERGY

BACKGROUND OF THE INVENTION

This invention relates to a device and process for converting random rocking motion into electrical energy. More particularly, the apparatus and process of this invention can be used to convert oceanic wave energy into electricity either on moored buoys or in small vessels.

Some systems for the conversion of ocean wave energy into electrical power have already been described. U.S. Pat. No. 4,178,517, for example, describes an apparatus which contains no moving parts. The apparatus of that invention comprises a floating cylinder with one open end submerged below sea level by a taut mooring. The cylinder is divided into an upper and lower chamber by a suitably supported protonic conductor mounted across the width of the interior. The protonic conductor is in contact with suitable electrodes which are connected to the electrical load. The inside of the cylinder is initially evacuated and then filled with hydrogen to some pressure. To prevent hydrogen loss, a flexible diaphragm, bellows or piston must separate this open end from the water. To operate as designed, the buoy must be held at a fixed distance from the floor of the sea by means of taut mooring. When the movement of the ocean causes the water level to rise, the pressure in the lower chamber increases and the hydrogen dissociates at the electrode. Protons migrate through the protonic conductor and electrons travel in the external circuit. In the upper chamber, recombination of protons and electrons occurs. The process is reversed when the water level falls. Similar constructions are described by R. E. Salomon, et al in *Ocean Engineering*, Vol. 6, pp. 317–327, 1979.

Other efforts to harness the motion of waves to produce electricity have been more conventional, utilizing conventional turbines or electrical generators mechanically driven by the motion of ocean waves. One such device is described in an article by M. E. McCormick in "A modified linear analysis of a wave energy conversion buoy", *Ocean Engineering*, Vol. 3, pp. 133–144. Such conventional power generation systems are subject to corrosion by the marine environment and mechanical parts require frequent maintenance.

The apparatus of the present invention comprises a floating buoy containing a U-tube which is allowed to rock back and forth by the ocean wave activity. Taut mooring is not required in this present invention and also, no flexible diaphragm, bellows or piston are required. Both of these factors render deployment of the present invention less costly and easier than the apparatus disclosed in U.S. Pat. No. 4,178,517.

SUMMARY OF THE INVENTION

A device for converting ocean wave energy into electricity either on moored buoys or in small vessels and a process for converting such energy into electricity have now been devised. The device of the invention is a U-tube in communication with a gas concentration cell. The U-tube in a cradle or other support means is secured to a buoy or other base which can impart motion thereto. The U-tube contains a liquid adequate to fill the base of the U and at least a portion of each arm at the maximum angle of displacement in operation. The variable space in each arm of the U-tube above the liquid is first evacuated in and then filled with hydrogen gas. The gas on each side of the U-tube communicates with the gas concentration cell which contains a protonically conducting membrane having two electrocatalytic electrodes which may be chemically deposited on the membrane surface. The hydrogen pressure cell produces an electrical output in response to the difference in hydrogen pressure across it, according to the Nernst equation.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 2 is a perspective view of a representative pressure cell.

FIG. 3 is a cross sectional view of the pressure cell taken along line 3—3 of FIG. 2.

DETAILED DESCRIPTION OF THE DRAWINGS

Figure 1:
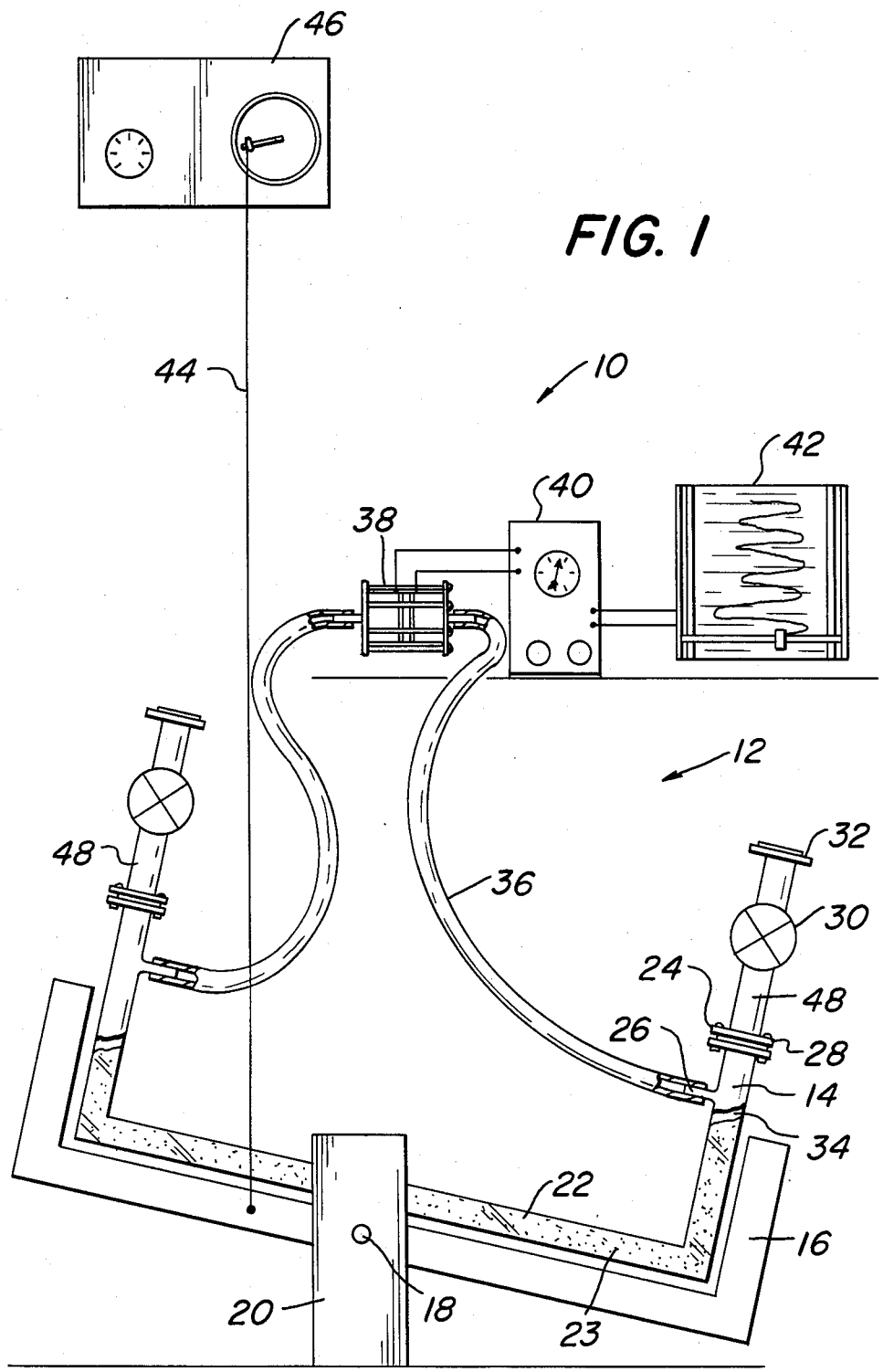
FIG. 1 is a schematic diagram of an experimental embodiment of the invention.

Referring to FIGS. 1–3, there is shown in FIG. 1 an experimental embodiment of the present invention generally denoted 10.

Device 10 generally comprises a pressure differential generating system 12 operatively associated with a gas concentration cell 38. In operation the device will be attached to a floating moored buoy, small boat or other base or platform which can impart the motion of the waves to the system. Clearly, the waves could be caused by ocean, sea, river, or any other natural or man-made water system.

The pressure generating system 12 preferably comprises a U-tube 14 which is held within a rockable cradle 16. The U-tube can be made of any material which is gas impermeable and rigid, for example, glass, plastic or metal. Cradle 16 is mounted upon a base 20 via a swivel 18. However, U-tube 14 need not be mounted within a separate cradle. It is important that the U-tube be allowed to rock back and forth.

U-tube 14 is filled with a liquid 22, as will be discussed in greater detail below. Preferably, liquid 22 is mercury, however, other liquid may be used. The U-tube includes two arms 24. Each arm 24 is identical, accordingly only one arm will be described in detail.

Arm 24 extends upwardly from a base 23 of the U-tube 14. The free end of arm 24 terminates with an O-ring joint 32. This joint 32 is for evacuating and filling the U-tube with liquid or gas. This joint 32 is optional as will be readily apparent to those of ordinary skill in the art.

Spaced away from O-ring joint 32 and toward base 23 of the U-tube is a valve 30. Valve 30 is preferably a KEL-F valve which is well known to those skilled in the art. The most essential feature of valve 30 is that it prevents the escape of any gas from the U-tube, so that pressure is maintained during operation. Valve 30 is optional in the commercial embodiment of the present invention.

A second O-ring joint 28 is located between valve 30 and base 23. O-ring joint 28 may be optional if a U-tube with integral valves 30 are used.

A nipple 26 is located between valve 30 and base 23. Nipple 26 is provide for securing a tube 36 which connects a variable volume space 48 in the U-tube to the gas concentration cell 38. The nipple must be positioned upon the arm of the U-tube in such a manner that liquid 22 does not enter the nipple or tube 36. Additionally, in the commercial embodiment, the nipple can be used to fill the U-tube with gas and or liquid.

Tube 36 may be any flexible, gas impermeable tubing such as "Tygon" tubing.

Cradle 16 is connected to a drive motor 46 via a line 44. Motor 46 imparts rocking movement to the cradle. Drive motor 46 is used to simulate ocean rocking motion.

A variable volume space 48 is located in each of the arms 24 of the U-tube 14 and is filled with a gas (preferably hydrogen) which is in continuous communication with the gas concentration cell 38. The variable volume in each arm of the U-tube is a function of the moving liquid 22.

Generally, the qas concentration cell 38 is operatively connected to an electric load. In FIG. 1, the load takes the form of a decadic resistance box 40 (which is well known to those skilled in the art). The resistance box 40 is in turn connected to a strip chart recorder 42 (which is well known to those skilled in the art). Strip chart recorder 42 records the energy produced by the device 10.

The embodiment illustrated in FIG. 1 is a representation of the experimental model. It will be well known to those skilled in the art that the drive motor 46, resistance box 40 and strip chart recorder 42 will not be necessary in a commercial embodiment of this invention. The simplest form of the invention is the combination of the gas concentration cell 38 with the pressure differential generating unit 12.

Referring to FIGS. 2 and 3, there is illustrated typical gas concentration cells 38. The gas concentration cell 38 illustrated in FIGS. 2 and 3 are merely representative and is not limiting on the present invention. U.S. Pat. No. 4,178,517 and U.S. patent application Ser. No. 665,671 filed Oct. 29, 1984 and allowed on Oct. 1, 1986 are incorporated herein by reference. Each of these U.S. patents illustrate additional gas concentration cell embodiments. Additionally, other cells are disclosed in TECHNICAL NOTE, *Solar Energy*, Vol. 23, pp 91–92 (1979).

Referring to FIGS. 2 and 3, and specifically to FIG. 3, gas concentration cell 38 generally comprises a protonic conductor 62. Preferably, the protonic conductor 62 is a copolymer of tetrafluoroethylene and perfluoro-3, 6-dioxa-4-methyl-7-octensulfonic acid or commercially from E. I. DuPont de Nemours and Co. under the trade name of Nafion 125. This preferred copolymer is more specifically described in U.S. Pat. No. 3,282,875. A metal layer 60, such metal may include platinum or palladium, is plated on each face surface of the conductor 62 which become the electricity generating means. Plating the metal layer on the protonic conductor is well known to those skilled in the art. Electrical charges are collected on these plates. The plates are electrically connected to the cell 38.

A porous graphite contact 58 is placed in engagement with the metal layer 60. A gasket 64 surrounds the graphite contact 58 and prevents the leakage of gas. A stainless steel disk 54 includes a gas passageway 56. Gas passageway may be centrally located within the disk 54. Passageway 56 provides gas communication from tubing 36 to the porous contact 58. Tubing 36 and passageway 56 are connected in any known manner. Importantly, the connection should minimize any gas leakage. Disks 54 hold the contact 58 in face to face engagement with layer 60 of the conductor 62. The entire gas concentration cell 38 is held together by retainer disks 50 which are held together by retainer bolts 52.

MODE OF OPERATION OF THE INVENTION

Figure 4A:
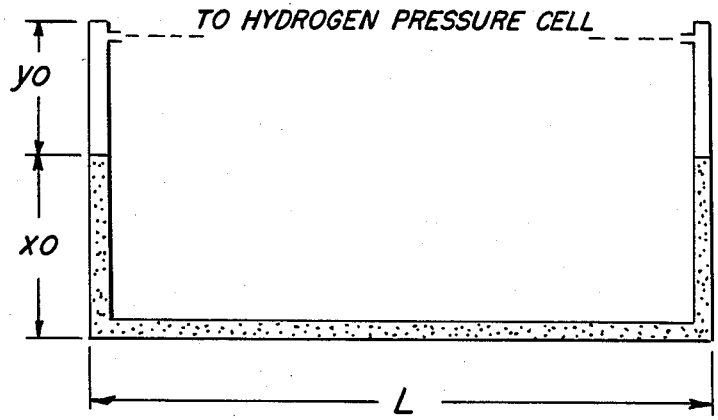
FIG. 4 defines parameters for the equations which define the mode of operation of the invention.
Figure 4B:
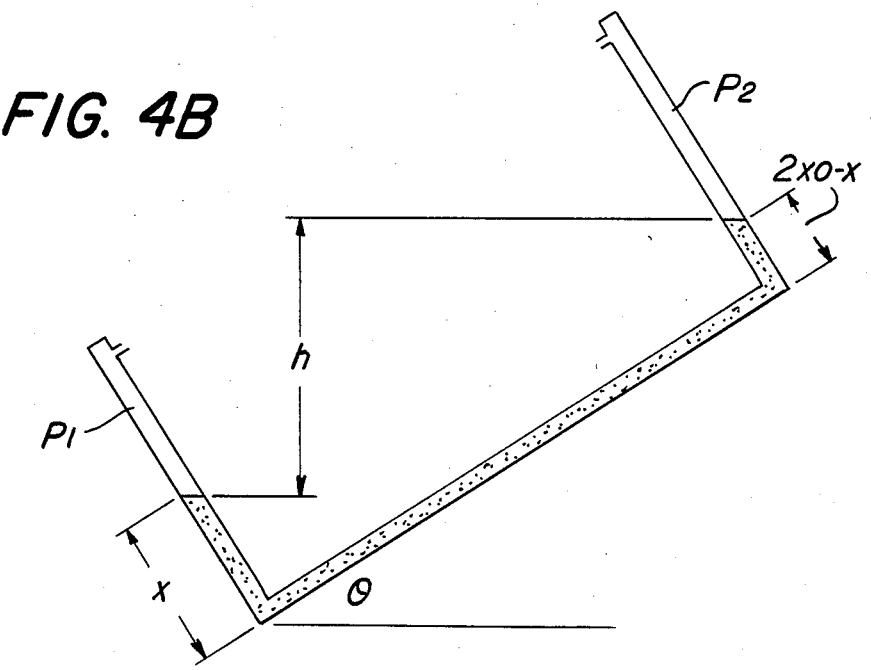

The operation of the invention is best described by reference to FIGS. 1 and 4.

Maximum power is produced using long U-tubes and high density liquids. The length of the U-tube is defined as the distance between the free ends of each arm. Representative, but non-limiting dimensions of the U-tube are set forth in Table 1.

Generally speaking, the pressure ratio generated by the moving liquid is the most important aspect of the present invention. This is because the gas concentration cell utilized in the present invention directly converts gas pressure to electrical energy and the electrical energy is a function of the pressure ratio across the cell. Sufficiently high pressure ratios can be achieved, even when water is used as the driving fluid, if the hydrogen pressure itself is kept low. However, the vapor pressure of water itself may become a factor at low hydrogen pressures. In addition, the resistance may increase substantially at the lower fill pressures.

When the U-tube is subjected to a rocking motion, the hydrogen above the liquid is compressed on the low side of the U-tube while the volume available to the hydrogen is increased on the high side where the pressure decreases. During the power conversion process, hydrogen is oxidized to form protons and electrons on the high side and protons are reduced to form hydrogen on the low pressure side of the U-tube.

The protons formed on the high pressure side travel through protonic conductor 62 from one side of the cell to the other. The protonic conductor 62 must be impermeable to molecular hydrogen but allow for conduction of protons from the high pressure to the low pressure side of the cell. The cell produces an electomotive force between two identical electrodes 60 in contact with a common electrolyte in the gas at two different pressures. When behaving reversibly and under no electrical load, the electromotive force, E, is given by the Nernst equation:

$$E = \frac{RT \text{Log}}{2F} (P_1/P_2) \quad (1)$$

where R is the gas constant, T is the temperature in kelvin, $P_1$ and $P_2$ are the two pressures and F is the Faraday constant. Under electrical load, the voltage is less than the Nernst voltage but electrical power is produced across the load and this power is given as $E^2/R$ where R is the load resistance in ohms.

In the present system, using a simple uniform thin tube geometry, the power conversion can be modelled as a function of the length of the tube, the rocking angle, the pressure of the gas in the tube, the density of the liquid, the absolute temperature, and the volume of free space above the liquid (variable volume 48). For a fixed rocking angle, power conversion increases as the tube length is increased, the free space is increased, the liquid density is increased, and the fill pressure increases. The equations by which power conversion can be calculated, referring to FIG. 4 to define various geometric terms, begin with the trigonometric relationship $$L \sin(\theta) + (2x_0 - x)\cos(\theta) - x\cos(\theta) = h \quad (2)$$

There are two conservation relations which apply. Since the total amount of hydrogen is fixed, $$n_1 + n_2 = 2n_o \quad (3)$$

where $n_o$ is the initial amount of hydrogen in each arm volume of the U-tube. Secondly, the total length of the mercury column is conserved and hence $$x_1 + L + x_2 = 2x_o + L \quad (4)$$

The difference between the two pressures $P_1$ and $P_2$ are related to h by the equation $$P_1 - P_2 = \rho g h \quad (5)$$

where $\rho$ is the density of the liquid and g is the gravitational constant. According to the ideal gas laws, $$P_1 V_1 = n_1 RT, \quad P_2 V_2 = n_2 RT \quad (6)$$

The volumes are related to the length of the arms of the U-tube by the relations $$V_1 = A(Y_o + x_o - x), \quad V_2 = A(Y_o - x_o + x) \quad (7)$$

where A is the cross sectional area of the U-tube (assumed uniform). Substituting into the Nernst equation gives $$E = \frac{RT}{2F} \log \frac{(n_1)(y_0 - x_0 + x)}{(y_0 + x_0 - x)(2n_0 - n_1)} \quad (8)$$

It is convenient to define dimensionless variables. These are $$z = \frac{x_0 - x}{L}, \quad B = \frac{y_0}{L}, \quad c = \frac{n_1}{n_0} \quad (9)$$

In addition, collections of constants are grouped together as $$\gamma = \frac{RTn_0}{A g L^2} \quad \gamma_2 = \frac{RT}{n_0 R_e 4 F^2} \quad (10)$$

where $R_e$ represents the sum of the load resistance and the cell resistance. The rate of hydrogen transfer through the hydrogen pressure cell is calculated as follows:

$$dc/dt = \frac{-E}{n_0 R e 2 F} = -\gamma_2 \log \frac{c(B - z)}{(B + z)(2 - c)} \quad (11)$$

The method of numerical solution is as follows. At time=0, assume the U-tube is horizontal and the rocking angle $\theta$ increases according to the relation $$\theta = AMP \sin(wt) \quad (12)$$

where AMP is the amplitude and w is the frequency. After the first time interval, the cubic equation is solved in z by the Newton-Raphson method. The Nernst equation is then used to calculate the voltage which is utilized in the hydrogen transfer equation to redetermine c. c is then placed in the trigonometric equation and the process is repeated. At each interval the power is calculated as the voltage squared divided by the resistance. To determine average power, these terms are summed and then divided by the number of terms. Some typical results are shown in Table I.

TABLE I

| CALCULATION OF AVERAGE POWER | | | | | |
|---|---|---|---|---|---|
| Average Power Watts | Pressure Torr | Resistance Ohms-$Log_{10}R_e$ | Amplitude Meters | L Meters | $Y_0$ Meters |
| 80.6 | 700 | 7 | 0.52 | 1 | 1 |
| 1370 | | 9 | | | |
| 298 | 100 | 8 | | | |
| 41 | 100 | 9 | | | |
| 17 | 200 | 10 | | | |
| 161 | 200 | 9 | | | |
| 38 | 300 | 9 | | | |
| 847 | 300 | 8 | | | |
| 21 | 100 | 6 | | | |
| 1600 | 700 | 9 | | | 0.5 |
| 626 | 400 | 9 | | | 0.5 |
| 0.806 | 700 | 5 | | | 1.0 |
| 1.45 | 300 | 5 | | | |
| 2.13 | 100 | 5 | | | |
| 2.38 | 50 | 5 | | | |
| 30.1 | 100 | 5 | | 2.0 | 0.5 |
| 66.47 | 100 | 5 | | 2.0 | 0.2 |
| 106 | 50 | 5 | | 2.0 | 0.2 |
| 2478 | 300 | 7 | | 2.0 | 0.2 |
| 2.65 | 760 | 7 | 0.1 | 1.0 | 1.0 |
| 10.66 | 760 | 7 | 0.2 | 1.0 | 1.0 |
| 24.2 | 760 | 7 | 0.3 | 1.0 | 1.0 |
| 74.8 | 760 | 7 | .52 | 1.0 | 1.0 |
| 4.18 | 400 | 7 | 0.1 | 1.0 | 1.0 |
| 5.57 | 200 | 7 | 0.1 | 1.0 | 1.0 |
| 169 | 200 | 7 | 0.52 | 1.0 | 1.0 |
| 693 | 760 | 8 | 0.52 | 1.0 | 1.0 |
| 2084 | 1500 | 9 | 0.52 | 1.0 | 1.0 |
| 10917 | 1500 | 9 | 0.52 | 2.0 | 0.5 |

It is to be understood that the mode of operation of the invention as embodied in the preceding equation and the discussion relating thereto is not to be considered a limitation on the scope of the invention as claimed. In particular, it will be clear to those skilled in the art that other geometric configurations besides the U-shaped tube can be utilized to generate the requisite gas pressure differential. The theory of the mode of operation has been included for the sake of clarity and completeness but should not be viewed as exclusive of other phenomena which may be involved in the operation of the invention.

What is claimed is:

1. A device for converting wave energy into electricity comprising:
   (a) a U-shaped tube having a base and two arms, said base being filled with a liquid and said arms being filled with hydrogen gas;
   (b) support means for holding the U-shaped tube;
   (c) a gas concentration cell containing a protonically conducting membrane having two electrocatalytical electrodes, said cell being in communication with the hydrogen gas in the arms of the U-shaped tube; and
   (d) means for floating the device on the surface of the ocean thereby imparting a rocking motion thereto, said rocking motion varying the pressure of the hydrogen gas in communication with the gas concentration cell, thereby generating an electric voltage across said electrodes in accordance with the Nernst equation.

2. The device for converting wave energy into electricity recited in claim 1 wherein the liquid in the U-shaped tube is water.

3. The device for converting wave energy into electricity recited in claim 1 wherein the liquid in the U-shaped tube is mercury.

4. A device for converting wave energy into electricity comprising:
(a) a tube which is filled with a liquid and a gas;
(b) support means for holding the tube, and for imparting a rocking motion thereto, said rocking motion varying the pressure of the gas in communication with the gas concentration cell, thereby generating an electric voltage by the electricity generating means in accordance with the Nernst equation; and
(c) a gas concentration cell containing a electricity generating means, said cell being in communication with the gas in the tube.

5. The device for converting wave energy into electricity recited in claim 4 wherein the gas in the tube is hydrogen gas.

6. The device for converting wave energy into electricity recited in Claim 4 wherein the liquid in the tube is water.

7. The device for converting wave energy into electricity recited in Claim 4 wherein the liquid in the tube is mercury.

8. A method for converting ocean wave energy into electricity comprising the following steps:
(a) attaching a U-shaped tube, having a base filled with a liquid and two arms filled with a gas, to a floatable platform;
(b) placing the gas filled arms of said tube in communication with a gas concentration cell containing a protonically conducting membrane having two electrocatalytical electrodes;
(c) placing the floatable platform on the surface of the ocean, thereby imparting a rocking motion thereto, said rocking motion varying the pressure of the gas in communication with the gas concentration cell, thereby generating an electric voltage across said electrodes in accordance with the Nernst equation.

* * * * *